United States Patent [19]

Beggs et al.

[11] 4,205,830
[45] Jun. 3, 1980

[54] APPARATUS FOR THE DIRECT REDUCTION OF IRON USING GAS FROM COAL

[75] Inventors: Donald Beggs, Charlotte, N.C.; Ullrich-Horst Buskies, Bad Vilbel, Fed. Rep. of Germany; John C. Scarlett, Toledo, Ohio

[73] Assignee: Midrex Corporation, Charlotte, N.C.

[21] Appl. No.: 933,690

[22] Filed: Aug. 15, 1978

[51] Int. Cl.$^2$ .............................................. F27B 1/24
[52] U.S. Cl. ................................. 266/156; 266/186; 266/195; 266/197
[58] Field of Search ............... 266/197, 156, 171, 186, 266/195

[56] References Cited

U.S. PATENT DOCUMENTS 3,853,538  12/1974  Nemeth ........................... 75/35

Primary Examiner—M. J. Andrews
Attorney, Agent, or Firm—Ralph H. Dougherty

[57] ABSTRACT

A method and apparatus for the direct reduction of iron in which a fossil fuel is gasified to produce a hot gas which is tempered with a carbon dioxide lean gas. The mixture is reacted with carbon to upgrade it in reducing potential and is desulfurized by reaction with lime in a first shaft furnace to form a hot reducing gas. The hot reducing gas is utilized as the reductant in a counter-flow shaft reduction furnace and the spent reducing gas is recycled as tempering gas for the gas from the hot gasifier. The apparatus includes a gasifier, counterflow shaft gas reactor, a shaft type direct reduction furnace and associated equipment.

4 Claims, 1 Drawing Figure

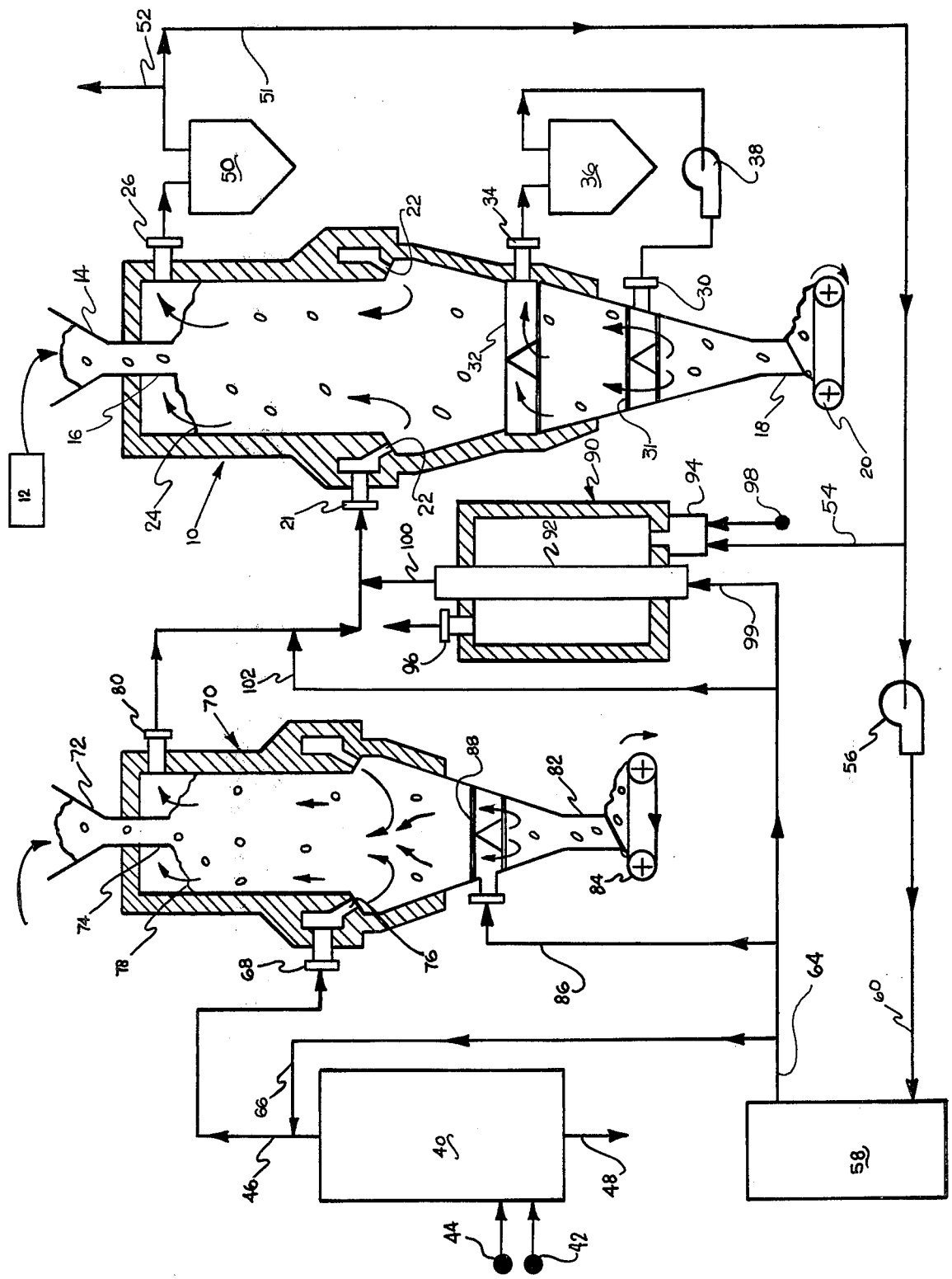

APPARATUS FOR THE DIRECT REDUCTION OF IRON USING GAS FROM COAL

BACKGROUND OF THE INVENTION

The direct reduction of iron oxide, such as pellets or lump ore, to metallic iron in the solid state has in recent years become a commercial reality in many direct reduction plants throughout the world. The combined annual capacity of these plants currently in operation or under construction is in excess of 15 million metric tons of direct reduced iron product, which is used primarily for feedstock in electric arc steelmaking furnaces. The world demand for additional direct reduced iron is projected to increase at a substantial rate for many years to satisfy a growing world need for such feedstock, as additional electric arc furnace steelmaking plants are constructed.

The majority of the plants producing direct reduced iron utilize natural gas as the source of reductant. The natural gas is reformed to produce the reductants CO and $H_2$. A few plants utilize coal as the source of reductant in rotary kiln processes, such as the SL/RN process, which directly react coal in-situ in the kiln without separately gasifying the coal to CO and $H_2$. The rotary kiln processes have an inherent coal utilization inefficiency in that approximately two-thirds of the coal is burned in the kiln to supply heat and only one-third is used to supply the reducing gas for direct reduction. This inefficiency results in a coal requirement of 5.0 to 6.0 Gcals (Gigacalories) per metric ton of direct reduced iron produced. This is in contrast to 3.0 to 3.5 Gcals of natural gas required per metric ton of direct reduced iron produced in the more efficient natural gas processes such as the Midrex, Purofer or Armco processes.

There are many processes, not yet commercialized, which gasify coal by partial oxidation with oxygen and steam to produce a gas which is then utilized in different manners in the direct reduction of iron. The principal reason none of these processes has been commercialized is either the process is too complex or impractical for commercialization, or the coal requirements are too high. The basic problem which leads to an impractical process or to a high total coal requirement is that the hot gas from the coal gasifier is too low in reductants (CO plus $H_2$) relative to oxidants ($CO_2$ plus $H_2O$ vapor) to be directly utilized efficiently in the direct reduction of iron.

In the present invention, the hot gas from the coal gasifier together with spent reducing gas from the reduction furnace are upgraded in reductants relative to oxidants by reaction with carbon and desulfurized by reaction with lime to produce a gas which can be used efficiently in the direct reduction of iron. These features together with high thermal efficiency make practical the commercial realization of direct reduction of iron using coal gasification as the source of reductant. The present invention requires approximately 3.1 Gcals of coal to be gasified and about 0.4 Gcal of coal for generating electricity at 30% conversion efficiency to produce oxygen for the gasification, for a total coal requirement of approximately 3.5 Gcals per metric ton of direct reduced iron.

OBJECTS OF THE INVENTION

It is the primary object of this invention to provide a practical and thermally efficient process for utilizing coal as the source of gaseous reductant in the direct reduction of iron.

It is also an object of this invention to provide an efficient apparatus for directly utilizing hot gas from a coal gasifier in the direct reduction of iron by upgrading the reducing potential of the gasifier gas by reaction with carbon.

It is another object of the invention to provide apparatus for desulfurizing hot gas for a coal gasifier by reaction with a sulfur acceptor such as lime.

It is an object of the invention to re-use spent gas from a direct reduction furnace in a more efficient manner than in prior coal-based direct reduction processes.

BRIEF DESCRIPTION OF THE DRAWING

The single FIGURE is a diagrammatic illustration of the preferred embodiment of the present invention.

DETAILED DESCRIPTION

A refractory lined counterflow shaft type direct reduction furnace is indicated generally in the drawing as 10. Iron oxide feed material 12, in the form of oxide pellets and/or natural lump ore of a nominal particle size in the range of 5 to 30 mm, is fed to a feed hopper 14 and into the furnace through a feed pipe 16 to establish a burden within the furnace. Reduced iron pellet and/or lump product is withdrawn from the lower region of the furnace through a furnace discharge pipe 18 by a discharge conveyor 20, the speed of which controls the rate of descent of the burden through furnace 10.

Fresh hot reducing gas is introduced to furnace 10 through a hot reducing gas inlet pipe 21 and then through a plurality of gas inlet ports 22 arranged in the refractory wall in the middle region of the furnace. The hot reducing gas flows inwardly, then upwardly in counterflow relationship to the descending burden. $CO_2$-rich spent reducing gas exits the burden near the top of the furnace at stockline 24 formed by the angle of repose of the feed from the oxide feed pipe 16. The $CO_2$-rich spent reducing gas, hereafter called top gas, exits the furnace through an offtake pipe 26.

The lower region of furnace 10 is provided with a cooling gas circuit for cooling the reduced iron prior to discharge. This cooling circuit includes a cooling gas inlet 30 leading to a cooling gas distributing member 31 within furnace 10, a cooling gas collecting member 32 positioned above the distributing member within the furnace, a cooling gas outlet member 34, and an external gas recirculating system having a cooler-scrubber 36 and a recirculating blower 38.

A fossil fuel gasifier 40, utilizing oxygen or oxygen and $H_2O$ admitted through an injector 42 is used to gasify a fossil fuel such as coal, lignite or char admitted through a fuel injector 44, in order to produce a hot gasifier gas which leaves the gasifier through pipe 46. Residual ash from the gasification of the fuel is withdrawn from the gasifier 40 through an ash discharge 48.

Top gas leaving furnace 10 through offtake pipe 26 is cooled and scrubbed of dust in a cooler-scrubber 50, then flows into pipe 51. A portion of the cooled top gas is vented from the system through vent pipe 52 to be used as a fuel gas for making steam as later described. A second portion of the cooled top gas is withdrawn through pipe 54 to be used as burner fuel. A third portion of the cooled top gas is compressed by a gas compressor 56 and then is admitted to a conventional regenerative type $CO_2$ removal unit 58 through pipe 60. In the $CO_2$ removal unit, a major portion of the $CO_2$ is removed from top gas to produce a $CO_2$-lean gas which exits unit 58 through pipe 64. A portion of the $CO_2$-lean gas is fed to a tempering pipe 66 for tempering hot gasifier gas in pipe 46 to a temperature below the ash solidification point. This tempering gas could alternatively be introduced to the gas discharge region of the gasifier 40 where it would have no significant adverse effect on the gasification temperature.

The hot gasifier gas in pipe 46, after being mixed with and partially cooled by tempering gas from pipe 66 is admitted to a gas reactor 70 through a gas inlet pipe 68. Reactor 70 is a refractory-lined counterflow shaft type reactor into the top of which particulate limestone and particulate carbonaceous material such as coke or coal char are introduced through feed hopper 72 and reactor feed pipe 74 to form a burden in the reactor. The tempered hot gasifier gas from gas inlet pipe 68 is introduced into the reactor through gas inlet ports 76 arranged in the refractory wall in the middle region of the reactor. This gas flows inwardly through the burden then upwardly in counterflow relationship to the descending burden. Reacted gas exits from the burden at a stockline 78. The reacted gas exits the reactor through an offtake pipe 80. Particulate reacted lime, containing sulfur, and any residual unreacted lime and carbonaceous material are withdrawn from the reactor through a reactor discharge pipe 82 by a discharge conveyor 84. Removal of the particulate material via pipe 82 establishes a gravitational burden flow and controls the rate of descent of the burden through reactor 70. A small portion of $CO_2$-lean gas from unit 58 is introduced through pipe 86 to a cooling gas distributing member 88 in the lower region of reactor 70 as cooling gas to cool the burden prior to discharge. This cooling gas flows upwardly through the reactor, is preheated by the hot descending burden before the gas reaches the middle or gas upgrading region of the reactor, and becomes mixed with the tempered gasifier gas.

Gas heater 90 is provided for heating $CO_2$-lean gas from pipe 99 to a temperature suitable for use as reducing gas for reduction furnace 10. The heater includes a plurality of heating tubes 92, only one of which is shown, one or more burners 94, and an exhaust gas flue 96. The hot exhaust gases from flue 96 are preferably utilized in a heat exchanger, not shown, to preheat combustion air from a source 98 for burners 94. The fuel for burner 94 is top gas introduced through pipe 54. The heated $CO_2$-lean gas leaves heater 90 through pipe 100, is mixed with hot reacted gas from reactor 70 and is tempered with cold $CO_2$-lean gas via pipe 102 to achieve desired furnace inlet gas temperature. This final gas mixture becomes the hot reducing gas introduced to reduction furnace 10 via gas inlet 21.

In the direct reduction of iron, the type of reduction furnace having the highest thermal efficiency is a counterflow shaft type furnace in which the reducing gas and solids being reduced are in counterflow relationship to each other. With such relationship the hot reducing gas serves not only to reduce the iron oxide to metallic iron but also to heat the incoming cold iron oxide feed to reducing temperature.

A counterflow shaft type furnace also has the highest chemical efficiency of any type of reduction furnace, provided that the hot reducing gas admitted to the furnace is of high enough quality. Reducing gas quality is commonly expressed as the ratio of reductants (CO plus $H_2$) to oxidants ($CO_2$ plus $H_2O$) in the gas mixture. Commercial operation experience with natural gas based plants has shown that in order to take full advantage of the inherent chemical efficiency of a counterflow shaft reduction furnace, the quality of the hot reducing gas should be at least about 8.

In the gasification of pulverized solid fossil fuels such as coal or lignite in a partial oxidation type gasifier such as gasifier 40, which produces a hot gasifier gas containing principally CO, $H_2$, and $CO_2$ and $H_2O$, the highest quality hot gas that is practical to be produced commercially is in the range of about 3 to 4. If such gas is cooled to ambient temperature and most of the $CO_2$ and $H_2O$ are removed, then of course the quality becomes quite high. However, such cooling to improve the quality is not economical, because the cold gas must then be reheated before it can be used as reducing gas in direct reduction. The present invention provides a method for upgrading the quality of the hot gasifier gas without cooling the gas below the temperature at which it will be introduced to the reduction furnace.

The following description of the operation of the present invention is based on gasifying a typical Western U.S.A. sub-bituminous coal using oxygen, $H_2O$ and pulverized coal in an entrained-bed type gasifier, which will produce hot gas containing principally CO, $H_2$, $CO_2$ and $H_2O$. The gasification temperature in such gasifier is generally about 1400° C. At this temperature the coal ash becomes liquid, is water quenched and removed from the bottom region of the gasifier as slag.

As a sepcific example of the present invention, and with reference to the drawing, hot reducing gas having a quality of 10.0 and at a temperature of 815° C. is introduced to reduction furnace 10 via gas inlet 21. The hot gas distributes across the burden in the furnace and then flows upwardly counter to the descending iron oxide burden. CO and $H_2$ in the gas react with the iron oxide to produce $CO_2$ and $H_2O$ and metallic iron by the well-known reduction reactions. Because of the chemical thermodynamics involved in the reduction of iron oxide to metallic iron, only a portion of the initial reductants (CO plus $H_2$) can be reacted before the oxidants ($CO_2$ and $H_2O$) which are formed cause reduction reactions to cease. This thermodynamic situation results in the spent reducing gas leaving the furnace at offtake pipe 26, having a quality of 1.5. In gas cooler-scrubber 50, much water vapor is condensed and removed from the gas resulting in cooled top gas having a quality of 2.0. This quality gas is a good fuel gas for burning, but it is essentially a neutral gas having no reducing potential for direct reduction of iron.

A minor portion of the 2.0 quality top gas is utilized as the fuel in the burner 94 of gas heater 90. Another somewhat greater but still minor portion of the top gas is vented from the system through vent pipe 52. This vented gas serves as the fuel for firing a boiler, not shown, to generate the steam necessary to operate the $CO_2$ removal unit 58. The major portion of the top gas is passed, recycled, through the $CO_2$ removal unit 58 wherein most of the $CO_2$ is removed resulting in $CO_2$-lean gas leaving the $CO_2$ removal unit in pipe 64. This $CO_2$-lean gas, which has a very high quality of 23.2, is utilized further in the process in four ways.

The hot gasifier gas leaving coal gasifier 40 in pipe 46 is at a temperature of 1370° C. and has a quality of 3.9. The gas contains $H_2S$ and COS from sulfur in the coal, some unreacted coal char and some liquid droplets of ash carryover. To solidify the liquid droplets of ash in the hot gasifier gas to enable it to be transported in pipes, a tempering stream 66 of cool $CO_2$ lean gas is mixed with the hot gas to give a mixture temperature of 1150° C. at reactor 70 gas inlet pipe 68. This tempering with cool $CO_2$-lean gas results in a mixture gas quality of 4.9 at gas inlet pipe 68.

Reactor 70 is fed a mixture of particulate carbonaceous material such as coke or anthracite type coal or coal char, hereinafter referred to as carbon, and particulate limestone. The particle size is preferably in a range of about 3 to 20 mm in order to have a reactor burden with good gas permeability. The mass flow rate of hot gas admitted to the reactor 70 is very high relative to the mass flow rate of cold limestone and carbon fed to the reactor. This results in the limestone and carbon being very rapidly heated to gas temperature when still at an elevation just below the stockline 78. This causes the limestone to be very rapidly calcined to burned lime (CaO) which is the proper form of lime for reaction with $H_2S$ and COS and removal of these constituents from the gasifier gas.

In the lower portion of the reaction zone in reactor 70, where the hot gas is introduced to the burden, oxidants ($CO_2$ plus $H_2O$) in the gas are reacted with carbon in the reactor burden to form reductants (CO plus $H_2$) by the well known reactions:

$$CO_2 + C = 2CO$$

and $$H_2O + C = CO + H_2$$

These reactions proceed at a useful practical rate as long as the temperature exceeds about 950° C. These reactions are endothermic which results in the cooling of the hot gas from the admission temperature of 1150° C. to the exit temperature of 950° C. The sensible heat made available in this 200° C. cooling of the gas will react enough carbon to upgrade the quality of the hot gas from 4.9, as admitted to the reactor to 7.4 in the lower portion of the reaction zone. This initial reaction with carbon results in the middle portion of the reaction zone operating at a temperature of about 950° C. which is a very favorable temperature for the well known reactions of $H_2S$ and COS with lime:

$$H_2S + CaO = CaS + H_2O$$

and $$COS + CaO = CaS + CO_2$$

The lowering of the oxidant ($CO_2$ plus $H_2O$) content in the hot gas by reaction with carbon also favors $H_2S$ and COS removal. The sulfur content of the hot gasifier gas for the particular coal selected is about 3700 parts per million volume (ppmv) as $H_2S$ plus COS. At the 950° C. reaction temperature and with the lowered $CO_2$ plus $H_2O$ content after reaction with carbon, the sulfur content of the gas leaving the reactor is about 135 ppmv. This level of sulfur is below the maximum that can be tolerated in the direct reduction of iron, and is even further decreased by mixing with sulfur-free hot or cold $CO_2$-lean gas from pipe 100 or 102. The amount of limestone required will depend on the sulfur content of the coal. The amount of $CO_2$ plus $H_2O$ formed in the reactor by the reaction of sulfur with lime is only a small fraction of the total gas volume and will have minor effect on the quality of the reacted gas leaving the reactor at outlet 80. The $CO_2$ released in the reactor by the calcining of the limestone to burned lime also has only minor effect on the gas quality. Both of these minor additions of $CO_2$ plus $H_2O$ are included in the tabulations hereinafter shown.

In reactor 70, the hot burden leaving the reaction zone is cooled before discharge by admitting a relatively small flow of $CO_2$-lean gas from pipe 86 to cooling gas distributing member 88. This high quality cooling gas flows upwardly and is forced toward the center of the reaction zone by the incoming gas from ports 76 after being preheated by the hot descending burden in the cooling zone.

The major portion of the $CO_2$-lean gas leaving $CO_2$ removal unit 58 through pipe 64 is admitted to the gas heater 90 through pipe 99. In the heater, which includes a plurality of heat resistant alloy heating tubes 92, the gas is heated to a temperature of about 815° C. which is a preferred operating temperature for direct reduction of most types of iron oxide feed materials. This temperature could be between 760° and 900° C. without departing from the present invention.

In the example, the reacted gas exiting reactor 70 through gas outlet 80 is at a temperature of 894° C., after having heated the incoming cold limestone and carbon feed and calcining and limestone to burned lime. This 894° C. reacted gas is cooled to about 815° C. by the admission of and mixing with a relatively small flow of $CO_2$-lean tempering gas from pipe 102. It will be understood that the addition of $CO_2$-lean tempering gas through pipe 102 could be eliminated by simply heating the $CO_2$-lean gas in heater 90 to a temperature less than 815° C. in order to achieve a reducing gas mixture temperature of about 815° C. at reducing gas inlet 21. The addition of tempering gas through pipe 102 simply makes it easier to control the temperature of the hot reducing gas admitted to reducing gas inlet 21.

The following tables give a comprehensive process analysis of the invented process and are keyed to the drawing. These data are to be understood as being merely illustrative and in no way limiting. All of the tabulations are based on one metric ton of direct reduced iron produced, having a degree of metallization of 92 percent and a carbon content of 1.5 percent. These are widely accepted commercial standards for direct reduced iron made in natural gas based direct reduction plants.

Table I shows the gas flow rates and gas quality (reductant to oxidant ratio) at the locations indicated with reference to the drawing.

TABLE I

| Item | GAS FLOWS Flow Sheet Number | Flow In *nm3 | Gas Quality |
|---|---|---|---|
| Gasifier Gas | 46 | 912 | 3.9 |
| Temper Gas | 66 | 233 | 23.2 |
| Gas Mixture into Reactor | 68 | 1145 | 4.9 |
| Gas Leaving Reactor | 80 | 1240 | 7.4 |
| Temper Gas | 102 | 143 | 23.2 |
| Heater Gas | 100 | 577 | 23.2 |
| Reducing Gas | 21 | 1960 | 10.0 |
| Spent Reducing Gas | 26 | 1947 | 1.5 |
| Scrubbed Top Gas | 51 | 1767 | 2.0 |
| Top Gas Vent | 52 | 254 | 2.0 |
| Top Gas as Heater Fuel | 54 | 116 | 2.0 |
| $CO_2$-Lean Gas | 64 | 984 | 23.2 |

TABLE I-continued

GAS FLOWS

| Item | Flow Sheet Number | Flow In *nm3 | Gas Quality |
|---|---|---|---|
| Reactor Cooling Gas | 86 | 31 | 23.2 |

*Normal Cubic Meters

Note:
Spent Gas flow at outlet 26 is less than reducing gas flow at reducing gas inlet 21 because 1.5% carbon is added to the direct reduced iron by reaction with the CO from the reducing gas.

Table II shows the feed requirements for the coal gasifier 40.

TABLE II

COAL GASIFIER

| Dry Coal (kg) | 451 |
|---|---|
| H$_2$O (kg) | 127 |
| Oxygen (nm$^3$ of 98% O$_2$) | 227 |

Table III shows the feed requirements and the outputs of reactor 70.

TABLE III

REACTOR
(all units are kg)

| Limestone in | 30.1 |
|---|---|
| CaO out | 8.4 |
| CaS out | 10.9 |
| Carbon from gasifier | 14.8 |
| External carbon fed | 23.8 |
| Total carbon reacted | 30.9 |
| Unreacted carbon out | 7.7 |

Table IV shows the energy requirements for the invented process.

TABLE IV

ENERGY

| Gasifier Coal | 2.9 Gcal |
|---|---|
| Reactor Carbon fed | 0.2 Gcal |
| Oxygen Plant Coal | *0.4 Gcal |
| Total | 3.5 Gcal |

*Approximately 140 kWh at 30% conversion efficiency

Table V shows the gas temperatures at the indicated locations in the process.

TABLE V

GAS TEMPERATURES

| Item | Flow Sheet Number | Temperature Degrees C. |
|---|---|---|
| Out Gasifier | 46 | 1370 |
| To Reactor | 68 | 1150 |
| After Carbon Reaction | 70 (in reactor) | 950 |
| Out Reactor | 80 | 894 |
| Reducing Gas | 21 | 815 |
| Gas Heater Flue Gas | 96 | 925 |

TABLE V-continued

GAS TEMPERATURES

| Item | Flow Sheet Number | Temperature Degrees C. |
|---|---|---|
| Gas Heater Burner Air | 98 | 450 |

Table VI shows the gas analyses at the indicated locations in the process.

TABLE VI

GAS ANALYSIS

| Item | Flow Sheet Number | % CO | % CO$_2$ | % H$_2$ | % H$_2$O | % CH$_4$ | % N$_2$ | ppmv (H2S + COS) |
|---|---|---|---|---|---|---|---|---|
| Gasifier Gas | 46 | 49.6 | 8.0 | 29.1 | 12.1 | 0.1 | 0.9 | 3700 |
| To Reactor | 68 | 49.6 | 6.8 | 31.9 | 10.0 | 0.1 | 1.3 | 2900 |
| Out Reactor | 80 | 52.4 | 6.1 | 34.4 | 5.7 | 0.1 | 1.3 | 135 |
| Reducing Gas | 21 | 51.4 | 4.6 | 37.6 | 4.3 | 0.2 | 1.9 | 85 |
| Spent Red. Gas | 26 | 31.7 | 24.0 | 27.5 | 14.7 | 0.2 | 1.9 | 0 |
| Top Gas | 51 | 35.0 | 26.4 | 30.3 | 6.0 | 0.2 | 2.1 | 0 |
| CO$_2$-Lean Gas | 64 | 49.7 | 2.0 | 43.1 | 2.0 | 0.3 | 3.0 | 0 |

There are currently numerous development and demonstration efforts taking place in the field of coal gasification, with an objective of commercially producing a hot gasifier gas of higher quality than 3 to 4. When commercial coal gasifiers, which produce hot gasifier gas of higher qualities, become available the tempering gas which is utilized in the present invention to temper the hot gasifier gas before entering the reactor need not be CO$_2$-lean gas, but can instead be low quality top gas from the reduction furnace and still be within the scope of the present invention. Process analysis indicates such top gas can be utilized for this tempering when the hot gasifier gas has a quality of 5 or higher, and still achieve a reducing gas quality at the reduction furnace reducing gas inlet of at least about 8. In this case, the reactor serves to upgrade the quality principally of the tempering gas portion of the gas mixture entering the reactor.

Although a counterflow type shaft reactor has been described for upgrading the quality and for desulfurizing the gas in reactor 70, it will be understood that this gas upgrading and desulfurizing can be accomplished in process apparatus other than a shaft reactor, such as a fluidized bed of carbon and lime particles, without departing from the basic concept of the present invention. The desulfurizing agent fed to the reactor may be burnt lime or another suitable sulfur acceptor such as manganese oxide. Further, as an alternative to adding carbon from an external source to the reactor, the coal gasifier may be operated to achieve sufficient carbon carryover to satisfy the carbon reaction requirement in the reactor.

It can readily be seen from the foregoing that we have provided an energy efficient, useful and practical apparatus for achieving direct reduction of iron utilizing coal gasifier gas as the source of reductant for the direct reduction.

What is claimed is:

1. Apparatus for reducing iron oxide with gas made by the gasification of fossil fuel, said apparatus comprising:
    (a) a fossil fuel gasifier for producing a gasifier gas;
    (b) a generally vertical shaft type gas reactor for treating said gasifier gas, said reactor having means at its upper end for introducing a particulate burden thereto and means for removing particulate material therefrom at its lower end, means intermediate said burden introducing and removal means for introducing gas from said gasifier to the burden in said reactor, and means for removing treated gas from said reactor;

(c) a first conduit communicating with said gasifier and said gas reactor for conducting said gasifier gas to said reactor;

(d) a generally vertical shaft furnace for the direct reduction of iron, having particle introducing means at the top thereof, particle removal means at the bottom thereof for establishing a descending burden therein, treated gas introduction means between said particle introducing means and said particle removal means, and means for removing a spent reducing gas from the top of said furnace;

(e) a second conduit communicating with said reactor and said furnace for conducting said treated gas to said furnace for use therein as reducing gas;

(f) means for cooling and scrubbing said removed spent reducing gas;

(g) a third conduit communicating with said spent reducing gas outlet and said cooling and scrubbing means;

(h) means for mixing cooled spent reducing gas with said gasifier gas;

(i) a fourth conduit communicating between said cooling and scrubbing means and said first conduit, said fourth conduit having means therein for removing $CO_2$ from said spent reducing gas; and (j) a fifth conduit communicating with said $CO_2$ removal means and said second conduit for tempering treated gas prior to its introduction to said furnace as reducing gas.

2. Apparatus according to claim 1 further comprising a heater for reheating $CO_2$-lean gas, a passageway between said $CO_2$ removal means and said heater for introducing $CO_2$-lean spent reducing gas to said heater, and a further passageway between the outlet of said heater and the reducing gas inlet of said furnace.

3. Apparatus for reducing iron oxide with gas made by the gasification of fossil fuel, said apparatus comprising:

(a) a fossil fuel gasifier for producing a gasifier gas;

(b) a generally vertical shaft type gas reactor for treating said gasifier gas, said reactor having means at its upper end for introducing a particulate burden thereto and means for removing particulate material therefrom at its lower end, means intermediate said burden introducing and removal means for introducing gas from said gasifier to the burden in said reactor, and means for removing treated gas from said reactor;

(c) a first conduit communicating with said gasifier and said gas reactor for conducting said gasifier gas to said reactor;

(d) a generally vertical shaft furnace for the direct reduction of iron, having particle introducing means at the top thereof, particle removal means at the bottom therof for establishing a descending burden therein, treated gas introduction means between said particle introducing means and said particle removal means, and means for removing a spent reducing gas from the top of said furnace;

(e) a second conduit communicating with said reactor and said furnace for conducting said treated gas to said furnace for use therein as reducing gas;

(f) means for cooling and scrubbing said removed spent reducing gas;

(g) a third conduit communicating with said spent reducing gas outlet and said cooling and scrubbing means;

(h) means for mixing cooled spent reducing gas with said gasifier gas;

(i) a fourth conduit communicating between said cooling and scrubbing means and said first conduit; and (j) cooling means in the lower region of said reactor for cooling the particulate reaction products prior to discharge.

4. Apparatus according to claim 1 further comprising a passageway between said $CO_2$ removal means and said cooling means for introducing $CO_2$-lean gas to said cooling means of said reactor as cooling gas.

* * * * *